310-10 SR
F213A XR 3,143,720

JOHN L. ROGERS
INVENTOR.
BY Jerry A. Dinardo
AGENT
Albert Rosen
ATTORNEY

United States Patent Office 3,143,720
Patented Aug. 4, 1964

3,143,720
SUPERCONDUCTIVE TRANSFORMER
John L. Rogers, Hermosa Beach, Calif., assignor to Space Technology Laboratories, Inc., Los Angeles, Calif., a corporation of Delaware
Filed Mar. 2, 1961, Ser. No. 92,953
12 Claims. (Cl. 336—155)

This invention relates generally to transformers and particularly to transformers especially designed for use in superconductive circuits.

It is known that many materials lose all apparent electrical resistance when they are subjected to very low temperatures, in the vicinity of absolute zero. A material exhibiting this characteristic is called a superconductor and the related phenomenon is termed superconductivity. The transition from the resistive state to the superconductive state occurs abruptly at a critical temperature known as the transition temperature, the particular temperature differing for each material.

It is also known that a transition from a superconducting to a resistive state can be induced in a superconductor by applying a magnetic field to the superconductor. The magnetic field can be applied externally to the superconductor or it can be induced by the flow of electric current through the superconductor. When the magnetic field or current is removed, the superconductor reverts to its superconducting state. In the presence of an external magnetic field, a superconductor requires less directly applied current, termed the critical current, to cause a transition, than it does when there is no external magnetic field present. By the same token, a superconductor carrying an internal current requires less externally applied magnetic field, called the critical external field, than it does when there is no current flowing through the material.

Superconductive, or cryogenic circuits offer a number of advantages in data processing and digital computing systems, such as extreme compactness, very high speed, low power consumption and relative ease of construction. However, it is not always possible to utilize superconductive circuitry exclusively, and sometimes hybrid arrangements are necessary, such as those using transistor or vacuum tube electronics.

The voltage and impedance levels experienced in cryogenic circuits are much smaller than those encountered in transistor or vacuum tube electronic circuits. Thus, a transformer can be used to great advantage to couple the output of the cryogenic circuitry to the input of the external electronic circuitry. However, the rise time of transformers with ferromagnetic cores is too great to permit full advantage to be taken of the speed of the cryogenic circuitry. This problem is particularly serious when it is desired to use the external electronics to examine the high frequency characteristics of the cryogenic circuitry.

Accordingly, a principal object of this invention is the provision of a transformer that is suitable for use in superconductive circuits.

A further object is the provision of a superconductive transformer which takes advantage of the very low impedance of cryogenic circuitry and avoids the use of ferromagnetic cores and their attendant low speed of response.

The foregoing and other objects are realized according to the invention in a novel transformer that utilizes a core formed at least in part of a superconductive material, instead of a ferromagnetic core, in such a way as to afford the advantages of a ferromagnetic core without its disadvantages.

In one embodiment of the transformer of the invention, a generally annular core includes a sheath of superconductive material, with the sheath being generally annular in cross section. The superconductive sheath is continuous along its main annular body but has at least one discontinuity along its cross sectional annular extent. A primary winding and a secondary winding are wrapped around the core to complete the transformer.

In operation, the transformer is subjected to a low temperature environment that maintains the sheath in a superconducting state. Since the superconducting sheath constitutes a highly effective shield against magnetic flux, the main flux generated in the space surrounded by the sheath, by primary current, is confined by the sheath so as to be entirely linked by the secondary winding. Nearly perfect coupling is thereby produced between the primary and secondary windings.

The same magnetic shielding property of the superconducting sheath prevents any external magnetic flux from penetrating through the sheath and thereby minimizes any coupling between external magnetic fields and the secondary winding. The discontinuity in the cross section of the sheath inhibits the flow of current in the sheath along a path that would link the main flux path and prevent the establishment of the main flux.

In the drawing, wherein like reference characters refer to like parts:

*Superconductive Phenomena*

At temperatures near absolute zero some materials apparently lose all resistance to the flow of electrical current and become what appear to be perfect conductors of electricity. This phenomenon is termed superconductivity and the temperature at which the change occurs, from a normally resistive state to the superconducting state, is called the transition temperature. For example, the following materials have transisition temperatures, and become superconducting, as noted:

| | ° Kelvin |
|---|---|
| Niobium | 8 |
| Lead | 7.2 |
| Vanadium | 5.1 |
| Tantalum | 4.4 |
| Mercury | 4.1 |
| Tin | 3.7 |
| Indium | 3.4 |
| Thallium | 2.4 |
| Aluminum | 1.2 |

Only a few of the materials exhibiting the phenomenon of superconductivity are listed above. Other elements, and many alloys and compounds, become superconducting at temperatures ranging between 0° and around 20° Kelvin. A discussion of many such materials may be found in a book entitled "Superconductivity" by D.

Schoenberg, Cambridge University Press, Cambridge, England, 1952.

The above-listed transition temperatures apply only where the materials are in a substantially zero magnetic field. In the presence of a magnetic field the transition temperature is decreased. Consequently, in the presence of a magnetic field a given material may be in an electrically resistive state at a temperature below the absence-of-magnetic-field or normal transition temperature. A discussion of this aspect of the phenomenon of superconductivity may be found in U.S. Patent 2,832,897, entitled "Magnetically Controlled Gating Element," granted to Dudley A. Buck.

In addition, the above-listed transition temperatures apply only in the absence of electrical current flow through the material. When a current flows through a material, the transition temperature of the material is decreased. In such a case the material may be in an electrically resistive state even though the temperature of the material is lower than the normal transition temperature. The action of a current in lowering the temperature at which the transition occurs (from a state of normal electrical resistivity to one of superconductivity) is similar to the lowering of the transition temperature by an external magnetic field, inasmuch as the flow of current itself induces a magnetic field.

Accordingly, when a material is held at a temperature below its normal transition temperature for a zero magnetic field, and is thus in a superconducting state, the superconducting condition of the material may be extinguished by the application of an external magnetic field to the material or by passing an electric current internally through the material. The minimum values of external magnetic field or internal electric current required to effect the superconducting to resistive transition are called the critical field and critical current, respectively.

*Superconductive Transformer*

Figure 1:
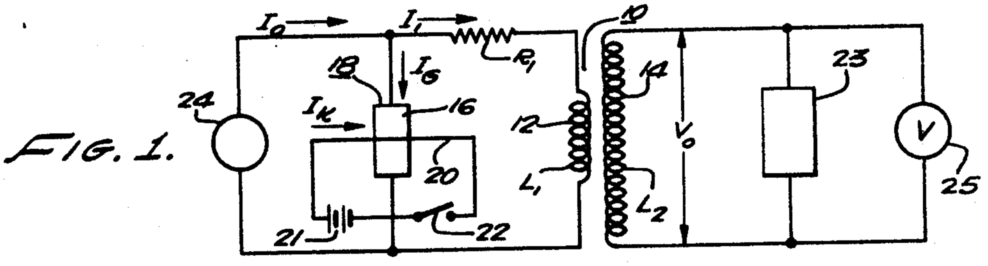
FIG. 1 is a schematic diagram of a coupling circuit utilizing the transformer of the invention.

FIG. 1 illustrates a typical circuit in which the superconductive transformer of the invention is used to provide coupling between a cyrogenic or low impedance input circuit and a conventional electronic or high impedance output circuit, such as one utilizing vacuum tube or transistor circuits. The circuit of FIG. 1 includes a superconductive transformer 10 having a primary winding 12 coupled to a secondary winding 14. The primary winding has a primary inductance, which is designated $L_1$, and a primary resistance, which is designated $R_1$ and is shown connected in series with the primary inductance $L_1$.

The gate element 16 of a cryotron 18 is connected across the primary winding 12. The cryotron 18 also includes a control element 20 that is coupled magnetically to the gate element 16. Current for energizing the control element 20 is supplied from a direct current source 21 serially connected to the control element 20 through a switch 22. The gate element 16 is preferably constructed of a superconductive material, such as tin or indium, that is easily transformed from a superconducting to a resistive state by a magnetic field. Another way of specifying the material of the gate element 16 is that it is one having a relatively low transition temperature. On the other hand, the material of the control element 20 is one having a relatively high transition temperature, such as lead or niobium, and thus a relatively high critical field or current, so that it will remain superconducting under normal operating conditions.

A load impedance 23, such as an electronic circuit, is connected across the secondary winding 14. Since the load impedance 23 in the secondary is many times greater than the impedance in the primary, the secondary can be considered to be open circuited. For proper impedance match between a low impedance in the primary circuit and a high impedance in the secondary circuit, the transformer 10 is considered to have a stepped up turns ratio, that is, the number of turns $n_2$ in the secondary winding

14 is much greater than the number of turns $n_1$ in the primary winding 12.

In the operation of the circuit, a direct current $I_0$ is fed from a constant current source 24 into the junction of the gate element 16 with the primary winding 12, the current $I_0$ being less than the critical current of the gate element 16. Considering no current to be flowing through the control element 20 and the gate element 16 to be initially in the superconducting state, and assuming that the primary winding 12 has a finite resistance $R_1$, all of the current $I_0$ will flow through the gate element 16 and no current will flow through the primary winding 12. This follows from the fact that the ratio of impedances of the primary winding 12 and the gate element 16 is infinite, for all practical purposes, and the current must divide inversely as the impedances. Since no current flows in the primary winding 12, no voltage will be detectable by a voltage responsive device 25 connected across the load impedance 23.

When a pulse of current $I_K$ is applied to the control element 20, upon closing of the switch 22, a magnetic field is created about the control element 20, which, if the current $I_K$ is sufficiently large, will act on the gate element 16 and cause it to undergo a transition from the superconducting to the resistive state. If the gate element 16 is in the form of a thin film of the order of .5 micron or less in thickness, the resistance $R_g$ of the gate element 16 will be of the order of one milliohm. A part of the current $I_0$ originally flowing entirely through the gate element 16 will now be diverted through the primary winding 12. The current $I_1$ flowing in the primary winding 12 will induce a voltage $V_0$ in the secondary circuit which can be utilized to detect the gate resistance change $R_g$.

Figure 2:
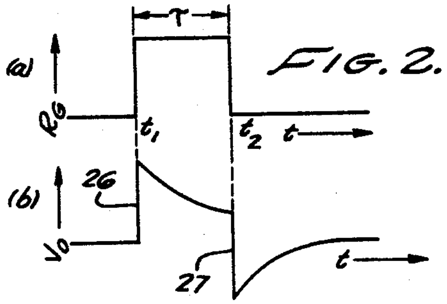
FIG. 2 is a series of graphs of waveforms useful in explaining the operation of the transformer of the invention.

In order for the output voltage $V_0$ to be an accurate representation of the change in resistance $R_g$ of the gate element 16, certain relationships must exist between the parameters of the transformer 10 and the gate resistance $R_g$. These relationships will be discussed with the aid of the graphs of FIG. 2 in which graph (*a*) depicts the variation in resistance $R_g$ of the gate element 16 as a function of time, and graph (*b*) depicts the variation in the output voltage $V_0$ as a function of time. It can be seen that prior to the application of the control current pulse $I_K$ both the resistance $R_g$ of the gate element 16 and the output voltage $V_0$ are zero. When the control current pulse $I_K$ is turned on, the gate element 16 goes resistive shortly thereafter, say at a time $t_1$. The resistance $R_g$ of the gate element 16 rises abruptly to its full value and remains there until the control current pulse $I_K$ is terminated, the resistance falling abruptly to zero at some time $t_2$.

While the resistance $R_g$ is rising to its full value the output voltage $V_0$ rises abruptly to a maximum value, which can be shown to be equal to $$\frac{n_2}{n_1}R_g I_0$$

Thereafter, when the gate resistance $R_g$ has been stabilized, the output voltage $V_0$ decays at a rate according to the exponential:

$$\epsilon^{-\left(\frac{R_1+R_g}{L_1}\right)t}$$

The rise and fall in the output voltage $V_0$ is evidenced by a positive step 26 in graph (*b*). In order that the transition of the gate element 16 from a superconducting to a resistive state be accurately observed by observing the output voltage $V_0$, it is necessary that the output voltage $V_0$ not decay too rapidly. In other words, the time constant of the circuit, $L_1/(R_1+R_g)$ must be much greater than the time interval $\tau$ during which the voltage $V_0$ is observed.

At time $t_2$ when the gate resistance $R_g$ falls to zero, the output voltage $V_0$ goes sharply negative and then decreases exponentially to zero, as evidenced by the negative step 27 in graph (*b*). In order that the output voltage $V_0$ be an accurate representation of the transition of the gate element 16 from a resistive to a superconducting state, it is necessary that the negative step 27 be substantially equal to the positive step 26. This requires the primary winding resistance $R_1$ to be much greater than the gate resistance $R_g$. The above resistance relationship can be seen by considering the following examples.

Suppose that instead of being much greater than the gate resistance $R_g$, the primary winding resistance $R_1$ were zero. Under these circumstances, when the gate element 16 transformed from the superconducting to the resistive state, all of the input current $I_0$ would eventually flow through the primary winding 12. Thereafter, when the gate element 16 reverted to the superconducting state, no change would occur in the current flowing through the primary winding 12 and no output voltage $V_0$ would appear.

On the other hand, if the primary winding resistance $R_1$ is much greater than the gate resistance $R_g$, when the gate element 16 goes resistive, current grows in the primary winding 12 but only a small fraction of the input current $I_0$ can eventually be diverted to the primary winding 12. The initial rate of increase of the primary current causes a step $\Delta V_0$ in the output voltage $V_0$. Thereafter when the gate element 16 reverts to the superconducting state, this small fraction decays and eventually reverts back to the gate element 16. The change in the rate of change of current in the primary winding causes substantially the same change $\Delta V_0$ in the output voltage $V_0$ as was experienced when the gate element 16 went resistive.

It is now clear that the primary winding resistance $R_1$ must be much greater than the gate resistance $R_g$, or $R_1 >> R_g$. Since the time constant of the circuit $$L/(R_1+R_g)$$

must be much greater than the time interval during which the output voltage $V_0$ is observed, or $L/(R_1+R_g)>>\tau$, it follows that $L/R_g$ must be several orders of magnitude greater than $\tau$. Since a gate element has a very low resistance even when it takes the form of a thin film, it will be seen that a relatively high inductance can be realized through the use of an air core transformer, thereby eliminating the need for a ferromagnetic core. Furthermore, the need for tight magnetic coupling between the primary and secondary windings 12 and 14 and for poor magnetic coupling between the secondary winding 14 and external fields can be realized through the use of a novel transformer arrangement which includes a superconductive core.

Figure 3:
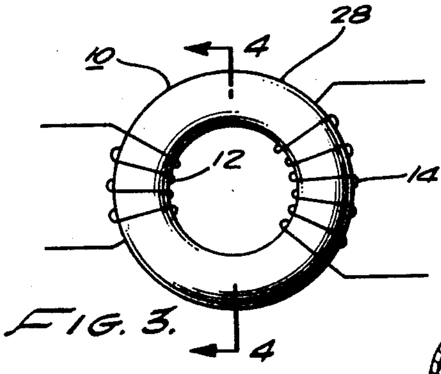
FIG. 3 is a plan view showing one form of construction of the transformer.
Figure 4:
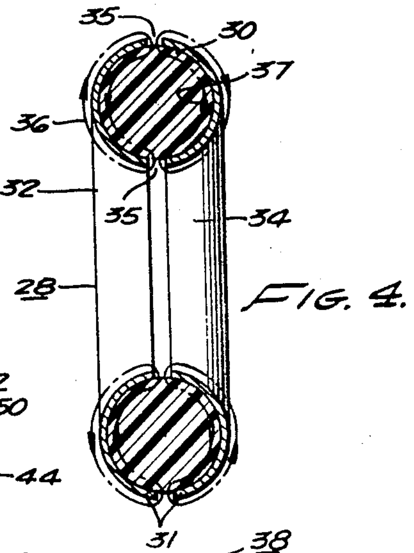
FIG. 4 is a section along line 4—4 of FIG. 3.

Referring now to FIG. 3 one form of transformer 10 according to the invention is shown. The transformer 10 includes a core 28 about which are wound the primary and secondary windings 12 and 14. As shown more clearly in FIG. 4, the core 28 preferably includes an inner toroid 30 of insulating material covered by a two-part sheath 31 of superconductive material. The two parts of the sheath 31 are designated by the numerals 32 and 34. The two sheath parts 32 and 34 are spaced slightly apart from each other along their main bodies. Thus, in cross-section the sheath 31 comprises a pair of semi-circular segments spaced closely apart by a pair of small discontinuities or gaps 35. Each sheath part 32 and 34 is continuous along its main body.

The primary and secondary windings 12 and 14, which may be made of nonsuperconductive material, such as copper, are insulated from each other and from the sheath 31. Alternatively, the windings 12 and 14 may be made of superconductive material, in which case a separate resistance member may be inserted in the primary circuit to serve as the primary resistance $R_1$. Each winding may cover the entire core 28 or just a portion thereof.

In such a configuration, a current flowing in the primary winding 12 will create a magnetic flux within the volume surrounded by the sheath 31 that is directed in circular paths along the annular extent of the sheath 31. Although the superconducting state of the sheath 31 would seem to preclude the establishment of a magnetic flux interiorly of the sheath 31 by a current flowing outside the sheath 31, the following theory might provide some clarification. It is believed that the current flowing in the primary winding 12 induces skin currents, shown by arrows 36 and 37 in FIG. 4 that flow along the outer surface of each sheath part 32 and 34, through the space between the sheath parts and along the interior surfaces of the sheath parts. Since the skin currents 36 and 37 flow in paths which do not link the flux path and since they flow in part on the interior surfaces of the sheath 31, they cause the magnetic flux to be set up interiorly of the sheath 31. If the sheath 31 were made in one piece, however, the paths of skin current flow would link the flux path and thereby would prevent the establishment of flux within the volume surrounded by the sheath 31.

Since the magnetic flux set up within the volume surrounded by the sheath 31 links the secondary winding 14, it induces a voltage within the secondary winding 14 that is a function of the rate of change of flux. Because the superconducting sheath 31 is a highly effective magnetic shield, the flux generated within the confines of the sheath 31 is prevented from leaking through the sheath 31. As a result the coupling between the primary and secondary windings 12 and 14 very closely approaches unity. The same shielding property of the superconducting sheath 31 prevents any external magnetic fields from penetrating the sheath and setting up any voltage disturbances in the secondary winding 14.

In one operative embodiment of the transformer 10, the inner toroid 30 was formed of a Plexiglas ring having an inner diameter of ⅜ inch and an outer diameter of ⅞ inch. The two sheath parts 32 and 34 were made of lead foil of about .003 inch in thickness. To provide effective shielding, the sheath 31 should have a thickness substantially greater than 0.1 micron, the penetration depth of magnetic field. The windings 12 and 14 were made from No. 36 enameled copper wire, with the primary winding 12 having 10 turns and the secondary winding 14 having 100 turns.

Figure 5:
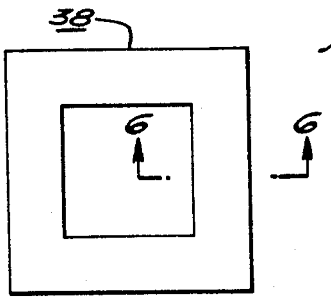
FIG. 5 is a plan view of a modified transformer core construction.

Although the core is more conveniently made in a circular configuration, it may have a rectangular, square, or other configuration. In FIG. 5, for example, the core 38 has a square configuration.

Figure 6:
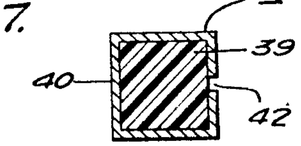
FIG. 6 is a section along line 6—6 of FIG. 5.

Furthermore, the core may have various cross-sectional configurations. In FIG. 6, for example, a square inner insulating member 39 is covered by a one-piece sheath 40 that has a single split or discontinuity 42 along one side thereof.

Figure 7:
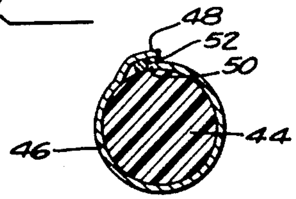
FIG. 7 is a sectional view of another form of core construction.

In FIG. 7, a circular insulating member 44 is covered by a one-piece sheath 46 whose overlapping ends 48 and 50 are separated by an insulation layer 52, which constitutes the discontinuity.

Figure 8:
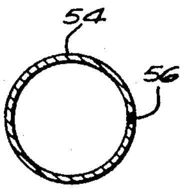
FIG. 8 is a sectional view of still another form of core construction.

In any of the foregoing and other embodiments, the inner insulation member may be eliminated by making the sheath or each of its parts thick enough to be self-supporting. Such a construction is shown in FIG. 8, wherein a one-piece circular sheath 54 has its abutting ends separated by an insulation layer 56.

Figure 9:
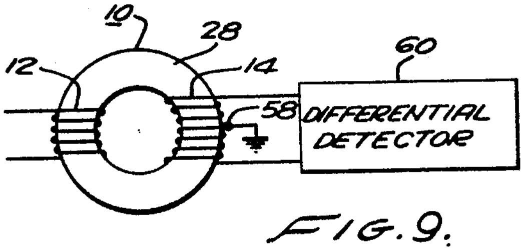
FIG. 9 is a schematic diagram of a modified form of coupling circuit utilizing the transformer of the invention.

In addition to providing impedance matching and voltage gain, a transformer on the output of cryogenic circuitry provides isolation which reduces the capacitive pickup by the output circuits from the input signals through the rather high capacity of the cryogenic circuitry. The capacitive pickup may be further reduced by providing the secondary winding 14 with a grounded centertap 58 as shown in FIG. 9. The output from the two ends of the secondary winding 14 is fed to a differential detector 60 where the signals produced through capacitive pickup are cancelled and the two halves of the wanted signal are added together.

It is now apparent that the superconductive transformer of the invention may be advantageously used in superconductive circuits to provide the functions of impedance matching and circuit isolation without deleteriously affecting other speed of response of the superconductive circuits.

The embodiments of the invention in which an exclusive property or privilege is claimed are defined as follows:

1. A superconductive transformer, comprising: a generally annular sheath of superconductive material, said sheath being continuous along its annular extent, said sheath being generally annular in cross section, with at least one discontinuity in the material along its cross sectional annular extent, input means coupled to said sheath for establishing magnetic flux within the volume surrounded by said sheath, and output means coupled to said sheath for extracting energy from said magnetic flux.

2. A superconductive transformer, comprising: a generally annular sheath of superconductive material, said sheath being continuous along its annular extent, said sheath being generally annular in cross section, with at least one discontinuity in the material along its cross sectional annular extent, a first electrical winding around at least a portion of said sheath, and a second electrical winding around at least a portion of said sheath, said windings being electrically insulated from each other and from said sheath.

3. The invention according to claim 2, wherein said windings are wrapped around separate portions of the sheath.

4. A superconductive transformer, comprising: an insulating member in the form of a toroid, a sheath of superconductive material substantially covering said member, said sheath being continuous along its toroidal extent, said sheath having at least one discontinuity in the material along its cross sectional annular extent, and a pair of electrical windings surrounding at least a portion of said sheath, said windings being insulated from each other and from said sheath.

5. A superconductive transformer, comprising: an insulating member in the form of a toroid, a sheath of superconductive material substantially covering said member, said sheath being continuous along its toroidal extent, said sheath having at least one discontinuity in the material along its cross sectional annular extent, and a pair of nonsuperconductive electrical windings surrounding at least a portion of said sheath, said windings being insulated from each other and from said sheath.

6. An article of manufacture, comprising: a generally annular sheath of superconductive material, said sheath being continuous along its annular extent, said sheath being generally annular in cross section, with at least one discontinuity in the material along its cross sectional annular extent, and the thickness of said sheath being appreciably smaller than its internal dimensions.

7. The invention according to claim 6, wherein said article is devoid of any solid matter within the inner volume surrounded by said sheath.

8. The invention according to claim 6, wherein said article includes an insulating member filling the space surrounded by said sheath.

9. The invention according to claim 6, wherein said discontinuity is formed by a thin insulation layer separating two abutting ends of said sheath.

10. The invention acocrdoing to claim 6, wherein said discontinuity is formed by a thin insulation layer separating two overlapping ends of said sheath.

11. An article of manufacture, comprising: an insulating member in the form of a toroid, and a sheath of superconductive material completely covering said member except for at least one annular gap extending along the main body of said toroid, the width of said gap being appreciably smaller than the cross sectional diameter of said sheath.

12. The invention according to claim 11, wherein said sheath is formed with two diametrically opposed gaps.

References Cited in the file of this patent

UNITED STATES PATENTS

| | | |
|---|---|---|
| 1,548,022 | Casper et al. | Aug. 4, 1925 |
| 2,946,030 | Slade | July 19, 1960 |

FOREIGN PATENTS

| | | |
|---|---|---|
| 125,076 | Switzerland | Mar. 16, 1928 |